(12) United States Patent
Elgamal et al.

(10) Patent No.: US 6,397,330 B1
(45) Date of Patent: May 28, 2002

(54) CRYPTOGRAPHIC POLICY FILTERS AND POLICY CONTROL METHOD AND APPARATUS

(76) Inventors: Taher Elgamal, 687 Driscoll Ct., Palo Alto, CA (US) 94306; Jeff Weinstein, 17500 Journey Rd., Los Gatos, CA (US) 95032; Nelson Bolyard, 273 Pescadero Ct., Milpitas, CA (US) 95035

( * ) Notice: Subject to any disclaimer, the term of this patent is extended or adjusted under 35 U.S.C. 154(b) by 0 days.

(21) Appl. No.: 08/940,429

(22) Filed: Sep. 30, 1997

Related U.S. Application Data
(60) Provisional application No. 60/051,307, filed on Jun. 30, 1997.

(51) Int. Cl.[7] .............................. H04L 9/00
(52) U.S. Cl. ................ 713/164; 713/166; 713/172; 713/189
(58) Field of Search ............... 380/25, 4, 49, 380/52, 44; 713/159, 173, 164, 166, 172, 189, 191

(56) References Cited

U.S. PATENT DOCUMENTS

| | | | | |
|---|---|---|---|---|
| 5,412,717 A | | 5/1995 | Fischer | 713/156 |
| 5,651,068 A | * | 7/1997 | Klemba et al. | 713/159 |
| 5,740,248 A | * | 4/1998 | Fieres et al. | 380/25 |
| 5,841,869 A | * | 11/1998 | Merkling et al. | 380/25 |
| 5,907,620 A | * | 5/1999 | Klemba et al. | 380/25 |

OTHER PUBLICATIONS

Schneier, Bruce. Applied Cryptography: Protocols, Algorithms, and Source Code in C, 2nd ed. Oct. 1995. pp. 34–35.*

* cited by examiner

*Primary Examiner*—Gail Hayes
*Assistant Examiner*—Ho S. Song
(74) *Attorney, Agent, or Firm*—Fish & Richardson P.C.

(57) ABSTRACT

Method, apparatus, system, and a file for integrated dynamic encryption and/or decryption for use in an application includes, for example, storage means or unit for storing a plurality of predetermined attributes and corresponding values, and a digital signature, a controller or control means for controlling selective retrieval of a plurality of attributes and values, and the digital signature from the storage unit, processing means or processor for selectively processing the predetermined attributes and values, and the digital signature and in accordance thereto, providing a supportable encryption and/or decryption level to the application, a compressor or compression means for compressing the attributes and values and in accordance thereto generating compressed attributes and values for storing in the storage unit, and decompressing means or decompressor for decompressing the compressed attributes and values in accordance with the controller retrieving the compressed attributes and values.

21 Claims, 6 Drawing Sheets

CRYPTOGRAPHIC POLICY FILTERS AND POLICY CONTROL METHOD AND APPARATUS

This application claims a benefit under 35 USC §119(e) of the provisional application filed Jun. 30, 1997, S/N 60/051,307.

This application is related to pending U.S. patent application Ser. No. 08/940,449 which is assigned to Netscape Corporation, the assignee of the present invention, and further, the disclosure of which is incorporated herein by reference.

TECHNICAL FIELD

This invention relates to cryptography configuration, more particularly, a method and apparatus for controlling the use of cryptography such that products utilizing these controls may be exported in accordance with United States export laws, and/or imported into other countries that place additional restrictions on the use of cryptography.

BACKGROUND

There are many circumstances where the distribution or the use of encryption software is regulated the government. In some countries, the strength of encryption that can be of is regulated without any restrictions on distribution of the encryption software within the country. For example, in the United States, companies are free to distribute any type of encryption software developed within the country for use by United States citizens. Furthermore, United States allows unrestricted importation of encryption technology. However, exporting of a certain strength encryption from the United States is regulated. In other countries, such as France, the strength of encryption that can be used, distributed, or imported is tightly regulated.

In case where exportation of encryption software is restricted, permissible exportable encryption software are usually limited to specific algorithms that use key sizes which are weaker than a particular size. Previously, encryption software has generally been an integral part of a software application. Therefore, to accommodate the varying degrees of permitted encryption levels, several versions of the same application are typically created; one version that provides strong encryption by those who are allowed unrestricted use, and one or more versions that use weaker encryption for those customers whose use is restricted. In many cases, one single weaker version is created to avoid the expense of creating and maintaining multiple versions of the same application.

One reason that applications distributed under these restricted rules have been required to include encryption modules as an integral part of the software, rather than as a separate module that can be plugged into the application, is to prevent an encryption module that supports strong encryption from being plugged into an application and used in a country where encryption is restricted, and thereby enabling strong encryption with that application.

Exportable/export strength encryption refers to encryption algorithms and key sizes that provide relatively weak (i.e., easy to defeat) protection of information. Presently, the United States government allows general purpose encryption products to be exported from the United States to other countries only if those products utilize approved encryption algorithms and key sizes that are weaker than a certain measure. General purpose encryption is an application of encryption that does not limit the type or size of the data being encrypted. The United States government places more restrictions on software that can encrypt any kind of data than it does on software that limits the type and size of the data being encrypted. SSL and S/MIME are considered to be general purpose encryption protocols because they do not place any limits on the type or size of the data being encrypted.

By contrast, special purpose encryption is an encryption application that limits the type and size of the data being encrypted. The United States government will sometimes give export permission for stronger encryption algorithms if they are limited in use to a specific purpose and type of data (strong encryption defined as encryption algorithms and key sizes that are stronger (i.e., harder to defeat) than those that the United States government usually allows to be exported for general purpose encryption). The SET protocol is an example of an encryption protocol that was designed to encrypt special purpose data for purposes of performing financial transactions only.

Recently, standards have been developed that define the interfaces between application software and modules that provide encryption. The purpose of these standards is to facilitate the use of Smart Cards and other hardware encryption devices. By defining a standard interface, and allowing encryption modules to be plugged into applications, any encryption module can be used with any application without having to write special software to integrate each module with each application.

The advent of these new standards presents a problem for application developers since applications that support pluggable encryption modules will be difficult or impossible to distribute under the current varying government regulations. In order to obtain the benefits of standards for pluggable encryption modules, an approach is necessary that satisfies governments by way of ensuring that their various levels of restrictions will be enforced. Such an approach will allow the application to be distributed separately from any encryption modules that it may use, but still allow the application to restrict the use of encryption to the permissible level.

One approach has been developed by Microsoft for their Crypto API (CAPI) system. Applications that use CAPI may only load encryption plugin modules that have been digitally signed by Microsoft. Microsoft will only sign a module once the developer of the module has agreed to abide by the governmental restrictions when distributing the module.

However, this approach poses several new problems. First, it requires a legal agreement between Microsoft and all developers of encryption modules, which can be expensive and time consuming. Another problem with the CAPI system is that it does not allow the application to access stronger encryption algorithms that may otherwise be available in the encryption plugin for those cases where only special purpose encryption is being performed for higher level of encryption transactions, and stronger encryption may be used legally. Some applications that would benefit from or require this type of access are: Secured Socket layer (which are exportable cipher suites that have 40-bit secret keys still use 128-bit RC2 or RC4 encryption, where the 40 bits of the 128-bit key are secret while the remaining 88 bits are not.); Special purpose encryption protocols such as SET (these protocols limit the scope and the size of the data that they encrypt, so that most governments allow them to use much stronger encryption algorithms and key sizes than would be allowed for general purpose encryption); and encryption of key material (generally, when key material is being encrypted, strong algorithms and larger key sizes can be legally used).

As previously discussed, because the level of permissible exportable cryptography varies depending upon the importing country, different versions of a single application are necessary. Also, these different versions of the same application differ in languages used in the manuals and in the help files that are part of the product. In the past, a separate version of the single application was developed for each market, embodying the legally marketable cryptographic policies, for sale and use of the application in the target market. Each of these different versions had to be separately built, tested, localized (translated into the local languages), and supported. The cost of these operations is considerably greater than if there was only one single version of the application to serve all the markets. Having a single application for all these markets can also reduce development and testing time, therefore, shorting the time between development and testing of a new application to marketing and sale.

As discussed above, to address the multiple-version issue, some manufacturers and developers only make and sell products that contain no cryptography, while others only make and sell products that contain only the weaker exportable forms of cryptography, the latter foregoing making stronger cryptography available inside the United States (where stronger cryptography is not subject to export regulations). There are also manufacturers and developers that make separate version of the same program for each of the differing markets, and bear the expense and time-to-market cost associated with making and supporting multiple versions of the same application/product.

With any of the aforementioned approaches, many customers including banks and financial institutions find the weaker level of security offered as exportable general purpose encryption to be unacceptable for financial transactions. Additionally, building separate programs substantially increases time and expenses in production, quality testing, and support for the products.

SUMMARY

In view of the foregoing, in accordance with the present invention, policy filters are provided in which an application is limited to accessing only those algorithms in an encryption module that are indicated in the policy filters, even if stronger encryption algorithms are available in the encryption module. The policy filter in accordance with the present invention allows anyone to develop a cryptographic plugin module without the need to have legal agreements between the application or API developers and the crypto module developers.

Moreover, the policy filters in accordance with the present invention allow separate controls to be used for the different APIs, Protocols, and Services in a system, so that the unique needs of each market can be met. The policy filters in accordance with the present invention are provided as a part of a system that includes cryptographic functionality. The cryptographic functionality includes information indicative of the cryptographic policies such as the various levels of allowable encryption between the different countries. The system including cryptographic functionality could be an operating system or an application platform such as the Netscape ONE platform as it exists in Netscape Communicator® or SuiteSpot® servers. These systems have cryptographic APIs, Protocols, and Services that are made available to layered applications. For further background information on layered applications, see U.S. Pat. No. 5,657,390 issued on Aug. 12, 1997, assigned to Netscape Corporation, the assignee of the present application.

Moreover, in accordance with another embodiment of the present invention, there is provided a cryptographic policy file including a cryptographic policy module. The cryptographic policy module, which is part of an application, accesses the cryptographic policy file when the application is executed and performs several validity verifications on the cryptographic policy file to ensure that the cryptographic policy file is legitimate and is being used in the market for which it was intended. If the cryptographic policy module determines that the cryptographic policy file passes these tests, the cryptographic policy module then enables or disables each of the possible forms of encryption which the application can request according to the contents of the cryptographic policy file.

Each of the program's cryptographic applications, for example, SSL, S/MIME, and PKCS #12, provides a uniform interface for turning each of its capabilities on or off, and for setting numeric parameters (e.g., key sizes). Also, each of these capabilities is pre-configured to a default "off" or "minimal security" state, and remains in that state until re-configured by the cryptographic policy module according to the contents of the cryptographic policy file when the application is first executed. Accordingly, a separate cryptographic policy file is provided for each market. Therefore, a single program can legally be used and sold in each of the aforementioned markets with varying levels of supportable encryption, and will provide the forms of encryption that are legally appropriate to each market according to the cryptographic policy file supplied to the specific market.

These and other features and advantages of the present invention will be understood upon consideration of the following detailed description of the invention and the accompanying drawings.

DETAILED DESCRIPTION

Figure 1:
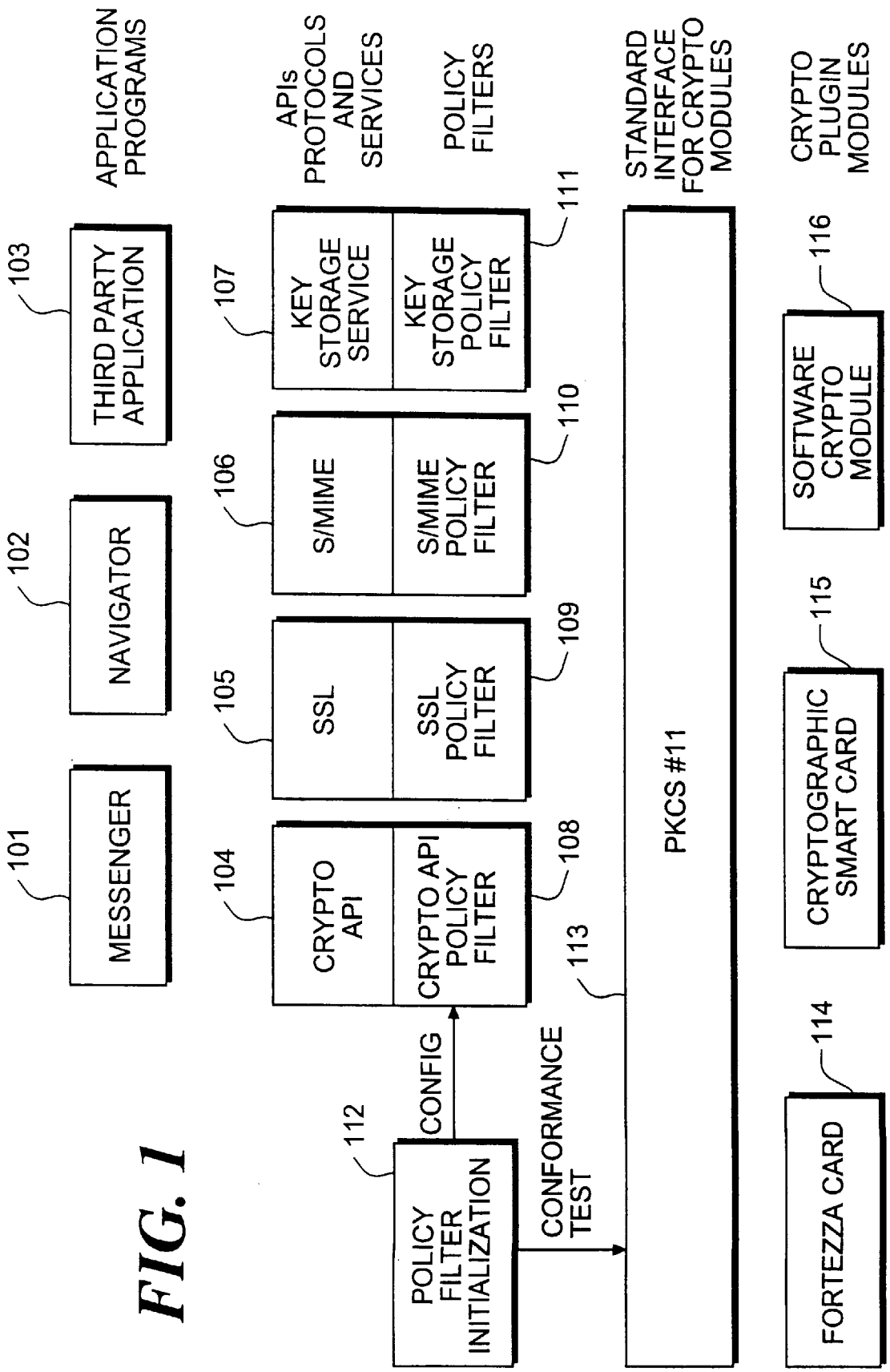
FIG. 1 illustrates a block diagram of a system including a policy filter in accordance with an embodiment of the present invention.

FIG. 1 illustrates a block diagram of a system including policy filters in accordance with an embodiment of the present invention. Various application programs—Messenger 101, the Navigator 102, and a "Third Party" Application 103 are shown. A plurality of policy filters are provided including a crypto API policy filter 108, an SSL policy filter 109, an S/MIME policy filter 110, and a key storage policy filter 111. Each of these policy filters is associated with a corresponding service module including a crypto API 104, an SSL 105, an S/MIME 106, and a key storage service 107, respectively.

Referring to FIG. 1, there is also provided a policy filter initialization module 112 which configures each of the policy filters (including the crypto API policy filter 108, the SSL policy filter 109, the S/MIME policy filter 110, and the key storage policy filter 111) of the system prior to the execution of the first cryptographic operation. There are also provided three cryptographic plugin modules including Fortezza card 114, cryptographic smart card 115, and a software crypto module 116.

Public key cryptography standard number 11 (PKCS #11) 113 operates as a standard interface to crypto modules. A crypto module, a cryptographic module, or an encryption module is a software module that provides a standard interface to low level cryptographic services such as encryption and decryption of data.

As will be further explained in more detail below in conjunction with FIG. 2, when one of the applications (the Messenger 101, the Navigator 102, or the third party application 103) is executed, the crypto plugin modules 114, 115, and 116 are loaded and the policy filters 108, 109, 110 and 111 are configured by the policy filter initialization module 112. Moreover, the policy filter initialization module 112 performs conformance tests upon the loaded crypto modules 114, 115, and 116.

Having thus initialized the policy filters 108–111 in the manner described above, service module capabilities are next determined as will be explained in more detail in conjunction with FIG. 3. Thereafter, when an application program (i.e., the Messenger 101, the Navigator 102, or a third party application 103) calls a service module (i.e., the crypto API 104, the SSL 105, the S/MIME 106, or the key storage service 107) to perform an operation that involves cryptographic functions, the called service module calls its respective policy filter (i.e., the crypto API policy filter 108, the SSL policy filter 107, the S/MIME policy filter 110, or the key storage policy filter 111) to determine whether the called operation is allowed. If the called operation is not allowed, then the service module returns an error to the application. If, however, the called operation is allowed, the service module performs the called operation, calling the cryptographic module when necessary, and returning the results to the application.

Figure 2:
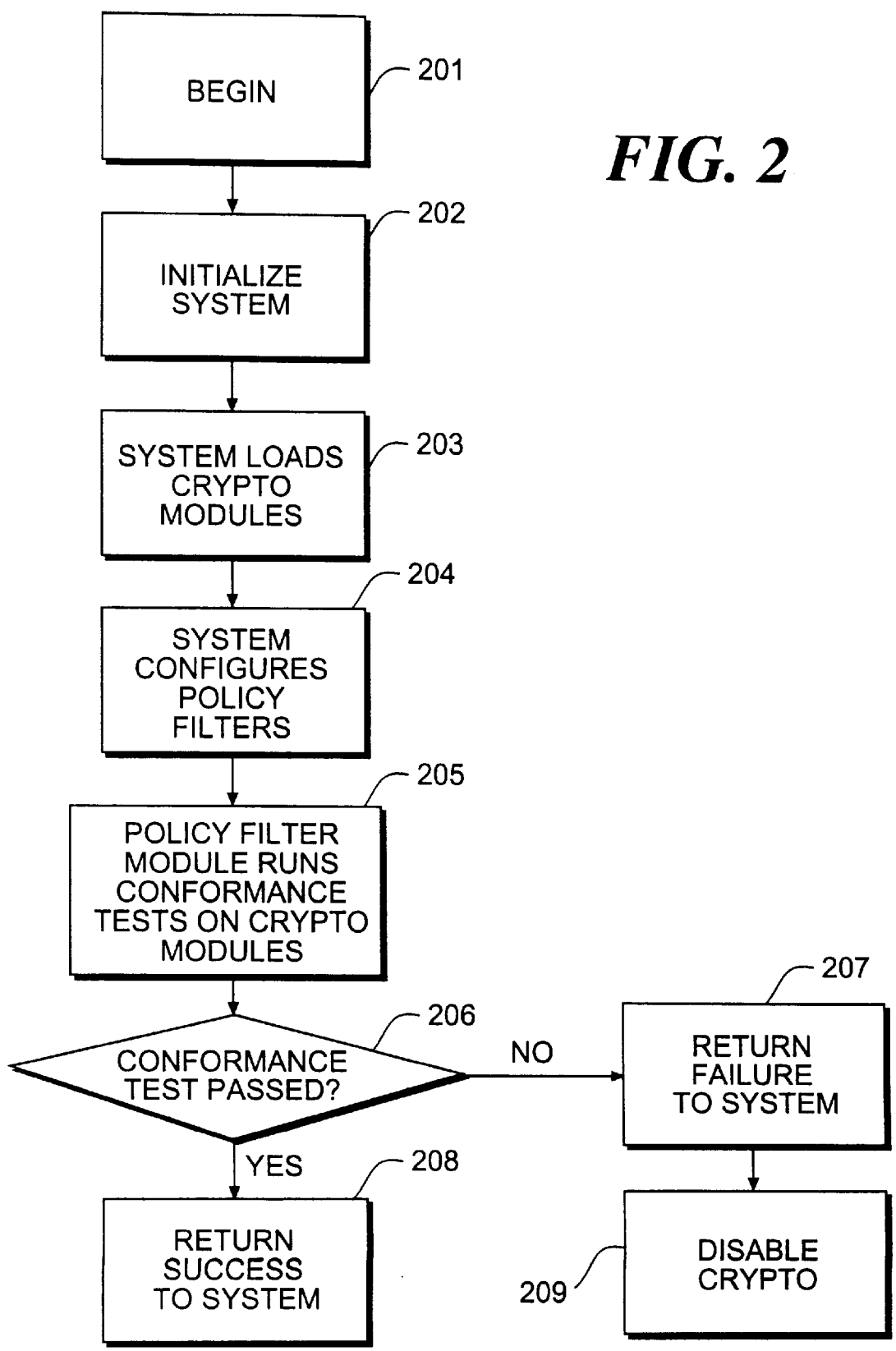
FIG. 2 illustrates a flow chart of the initialization of the policy filter in accordance with an embodiment of the present invention.

FIG. 2 is a flow chart illustrating the initialization of the policy filters in accordance with an embodiment of the present invention. As shown, when the system of FIG. 1 begins the initialization at step 202, the system first loads the crypto modules (for example, the Fortezza card 114, the cryptographic smart card 115 and the software crypto module 116) at step 203. Loading the crypto modules entails invoking a dynamic mechanism provided in operating systems for loading modules of code, referred to as shared libraries or dynamic link libraries (DLLs), into an already running application program. In this manner, the crypto module code is dynamically loaded by the operating system into the running application program. The system then configures the policy filters at step 204.

The policy filter initialization module 112 (FIG. 1) then performs conformance tests on the crypto modules at step 205. The conformance tests involve requesting the crypto module to perform a cryptographic function, then comparing the results to the result of a known compliant implementation of the same algorithm. If, at step 206, the conformance tests performed by the policy filter initialization interface 112 is successful, then a result of success is returned to the system at step 208. If, however, the conformance test performed at step 206 is not successful, (i.e., the crypto module does not correctly implement the algorithms and/or key sizes configured), then a result of failure is returned to the system at step 207, followed by a disabling of the crypto module at step 209 which failed the conformance test.

In the manner described above, the initialization of the policy filter prevents a cryptographic module from incorrectly stating its capabilities in order to bypass the system's controls. Accordingly, the conformance tests in accordance with the present invention are sufficiently broad to ensure that the cryptographic module is correctly implementing the algorithms and that the key sizes advertised therefrom are indeed being used.

Figure 3:
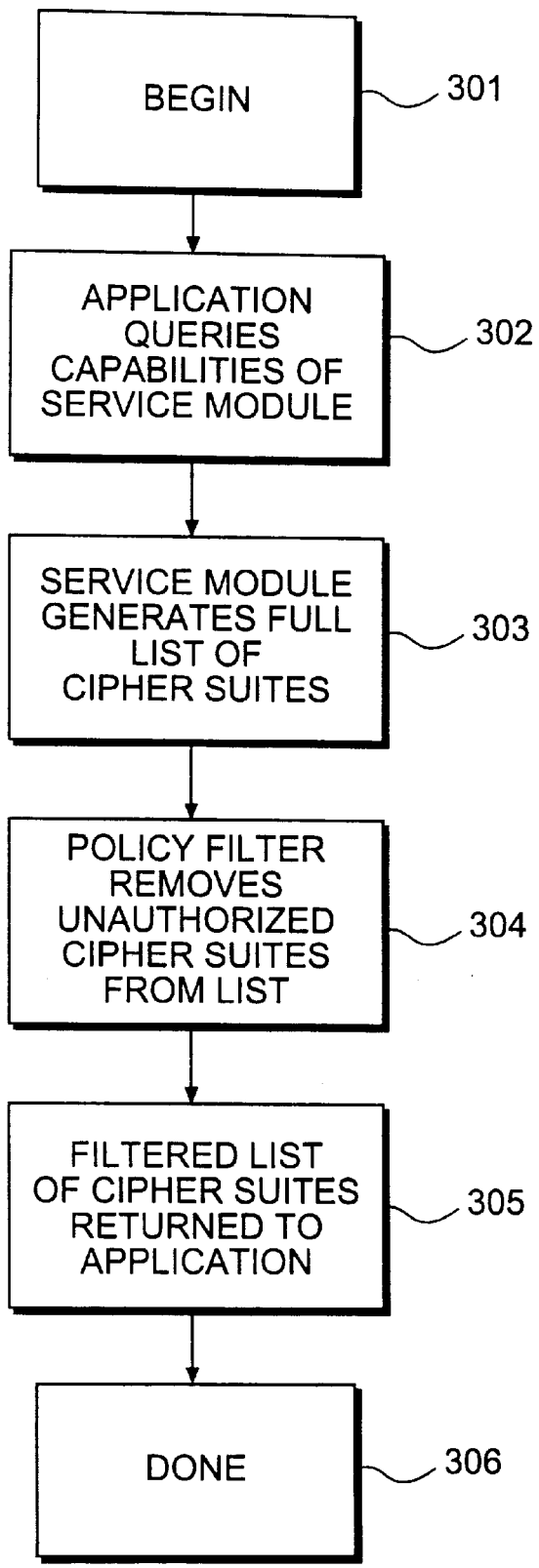
FIG. 3 illustrates a flow chart of the control of capability query through the policy filter in accordance with yet another embodiment of the present invention.

FIG. 3 is a flow chart illustrating the control of capability query through a policy filter (i.e., one of the policy filters 108–111 of FIG. 1) in accordance with one embodiment of the present invention. As shown, when the query begins at step 301, the application initially queries the capabilities (i.e., cipher suites that it supports) of the service modules at step 302. Accordingly, at step 303, a corresponding service module (which is one of the service modules 104–107 of FIG. 1) generates a full list of cipher suites that it supports and passes this list to the policy filter. In this regard, a cipher suite is a collection of encryption algorithms, key sizes, and parameters that fully specifies the type and the strength of a particular cryptographic operation.

At step 304, the policy filter applies its configuration parameters to filter out or remove unauthorized cipher suites from the list received from the service module at step 303. After filtering at step 304, the policy filter then returns the filtered list of cipher suites to the service module at step 305, which, in turn, returns the filtered list of cipher suites to the application. With the list of filtered (or authorized) cipher suites, the application causes a cryptographic operation to be performed in accordance with FIG. 4.

Figure 4:
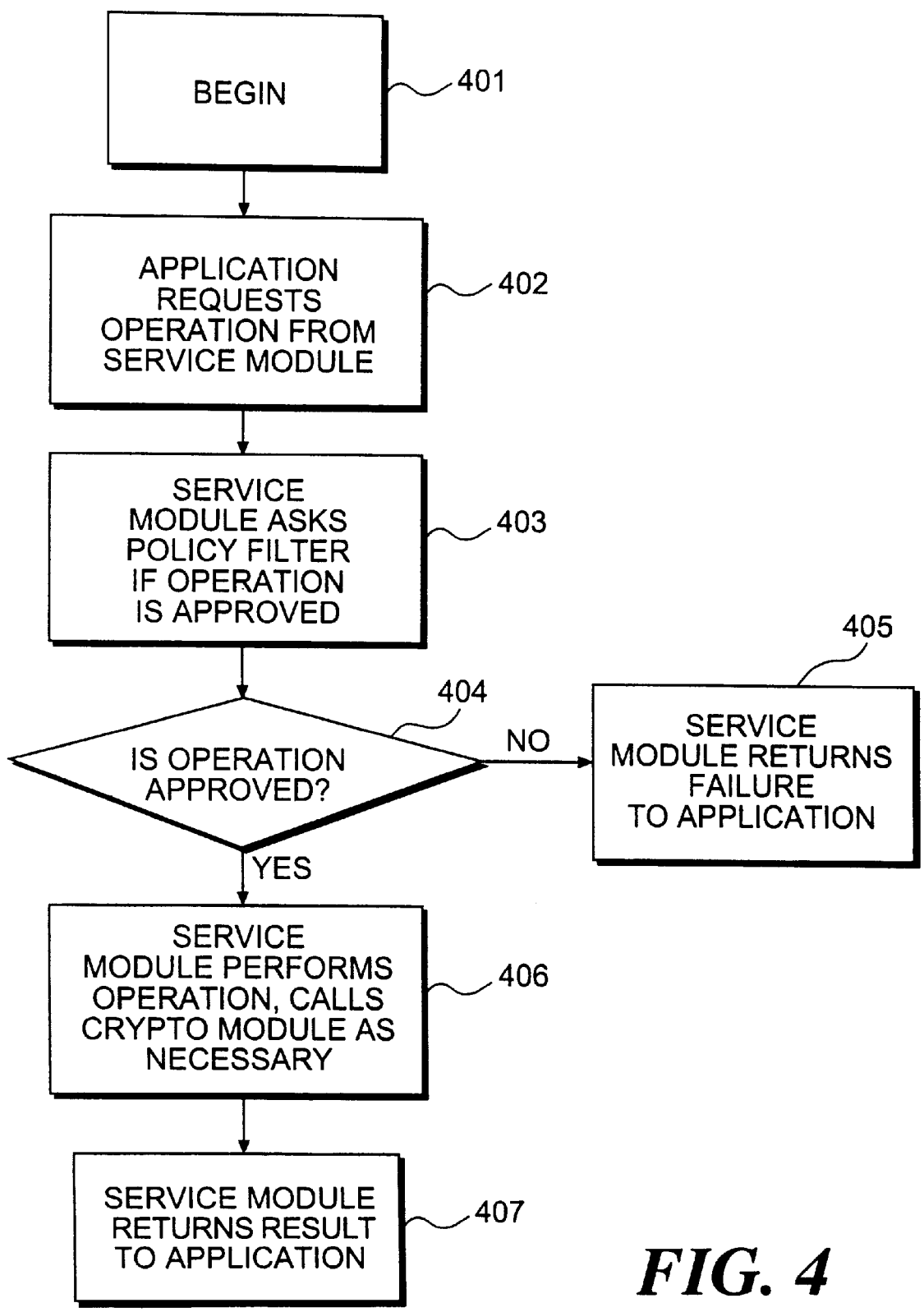
FIG. 4 illustrates the control of cryptographic operation through the policy filter in accordance with an embodiment of the present invention.

Referring now to FIG. 4, the cryptographic operation is initiated by an application at step 401. The application calls a service module to request an operation involving cryptographic functions at step 402. At step 403, the service module calls its corresponding policy filter to determine whether the called operation is allowed. At step 404, if the called operation is not approved by the corresponding policy filter, then the service module returns an error to the application at step 405. On the other hand, if, at step 404, the called operation is approved, then at step 406, the service module performs the called operation, calling the cryptographic module as necessary. Thereafter, the service module, at step 407, returns the operation results to the application.

In accordance with the present invention, the policy filters are configured by the system as shown in FIG. 1 before the first cryptographic operation is performed. The policy filter module provides a configuration interface for this purpose. The policy filters will have a default configuration, which may be to disable all operations, or to allow a subset of operations that are generally allowed by the most restrictive configurations. There are numerous mechanisms that the system may use to determine the correct configuration parameters for the policy filters. Some examples include, but are not limited to, compiling the parameters into the system or reading the parameters from a protected file (e.g., such as a digitally signed file). It is to be noted that some application programs may be compiled into one system, while other application programs may by dynamically loaded.

The policy filter module also performs conformance tests on the cryptographic module to ensure that the crypto module is correctly implementing the algorithms and key sizes that it is advertising. This is to prevent a cryptographic module from incorrectly stating its capabilities in order to bypass the system's controls. The sets of tests are broad enough to ensure that the module is correctly implementing the algorithms and that the key sizes being advertised are indeed being used.

As illustrated above, the policy filters in accordance with the present invention are associated with each service module that will use the cryptographic services provided by the cryptographic module. The policy filters control both the capabilities advertised by the service modules and the operations the service modules are allowed to perform. The process of requesting the capabilities of a service module involves first the application querying the service module for the list of cipher suites that it supports. In response, the service module passes its list of supported cipher suites to its policy filter. With the list of supported suites, the policy filter applies its configuration parameters to filter the list of cipher suites. Having filtered the list of cipher suites, the policy filter returns the filtered list of cipher suites to the service module, which, then returns the filtered list of cipher suites to the application.

In accordance with another embodiment of the present invention, there are provided cryptographic policy files comprising a set of ASCII-coded Attribute-Value pairs which may optionally be compressed, and a digital signature on the set of Attribute-Value pairs. The set of Attribute-Value pairs is a series of lines of plain ASCII text. Each line contains the name of an attribute of the cryptographic policy, followed by a colon, optionally some space, and the value of that attribute. A value may be in the form of a sequence (or "string") of printable ASCII characters, an integer number, or a "truth expression", that is, one of the words "true", "false" or "conditional." The following Table 1 illustrates the attribute name, its type and purpose, all of which are required in each cryptographic policy file.

TABLE 1

Attribute in Cryptographic Policy Files

| Attribute Name | Type | Purpose |
|---|---|---|
| POLICY-BEGIN-HERE | String | Name the policy (market) for this file, for example, "Export Policy." |
| Software-Version | String | Identifies the program, its version number, and the localization (language) incorporated in the program, for example, "Mozilla/4.0P3 [fr]." |

All other attributes are dependent upon the cryptographic capabilities of the program. Each and every cryptographic capability of the program that is subject to the export laws of the United States, or to the import laws of other countries, must be named as an attribute of the cryptographic policy in each of the cryptographic policy files produced for that program. The following Table 2 illustrates a sample Attribute-Value pairs incorporated into a program.

TABLE 2

Sample Attribute-Value Pairs

| | Export policy |
|---|---|
| POLICY-BEGINS-HERE: | |
| Software-Version: | Mozilla/4.0P3 [fr] |
| MAX-GEN-KEY-BITS: | 512 |
| PKCS12-DES-EDE3: | false |
| PKCS12-RC2-128: | false |
| PKCS12-RC4-128: | false |
| PKCS12-DES-56: | false |
| PKCS12-RC2-40: | true |
| PKCS12-RC4-40: | true |
| PKCS12-NULL: | true |
| SSL2-RC4-128-WITH-MD5: | false |
| SSL2-RC2-128-CBC-WITH-MD5: | false |
| SSL2-DES-168-EDE3-CBC-WITH-MD5: | false |
| SSL2-DES-56-CBC-WITH-MD5: | false |
| SSL2-RC4-128-EXPORT40-WITH-MD5: | true |
| SSL2-RC2-128-CBC-EXPORT40-WITH-MD5: | true |
| SSL3-FORTEZZA-DMS-WITH-FORTEZZA-CBC-SHA: | false |
| SSL3-FORTEZZA-DMS-WITH-RC4-128-SHA: | false |
| SSL3-RSA-WITH-RC4-128-MD5: | conditional |
| SSL3-RSA-WITH-3DES-EDE-CBC-SHA: | conditional |
| SSL3-RSA-WITH-DES-CBC-SHA: | false |
| SSL3-RSA-WITH-RC4-40-MD5: | true |
| SSL3-RSA-WITH-RC2-CBC-40-MD5: | true |
| SSL3-FORTEZZA-DMS-WITH-NULL-SHA: | false |
| SSL3-RSA-WITH-NULL-MD5: | true |
| SMIME-DES-EDE3: | false |
| SMIME-RC2-CBC-128: | false |
| SMIME-RC5PAD-64-16-128: | false |
| SMIME-DES-CBC: | false |
| SMIME-RC2-CBC-64: | false |
| SMIME-RC5PAD-64-16-64: | false |
| SMIME-RC2-CBC-40: | true |
| SMIME-RC5PAD-64-16-40: | true |

The set of attribute-value pairs in the cryptographic policy file in accordance with the present invention can also be compressed to reduce its size and to make the contents less apparent to others.

As previously explained, the second component of the cryptographic policy file is the digital signature. A digital signature is a block of data (a very large number) computed mathematically from another set of data (the "signed data") using the signer's "private key". The digital signature may be used to verify that the signed data has not been altered in any way since it was signed, and that it was genuinely signed by the party named in the signer's certificate. The digital signature affirms the authenticity and the integrity of the signed data, which, in accordance with the present invention, is the string of Attribute-Value pairs.

The digital signature is stored in the file as a part of a "signed-data content type" block, as defined in Public Key Cryptography Standard #7 (PKCS #7). A signed-data content type block is a block of data in the format standardized for the representation of digital signatures. It contains a digital signature, the certificate used to verify the signature (the "signer's certificate"), the chain of Certification Authority (CA) certificates used to validate the signer's certificate, and optionally the data that was signed by the digital signature (the "signed data"). An "external Signature" is a signed-data content type data block containing a digital signature, the signer's certificate, and a certificate chain, but not containing the signed data.

A Certification Authority is an entity that issues (or signs) digital certificates. Furthermore, a Certificate Chain is a list of certificates, each one (except the last) issued, signed, and authorized by the party identified in the succeeding certificate in the list. The Certificate Chain is used to determine the validity and veracity of the first certificate in the chain, which is usually the certificate of a document's signer. The final certificate in the chain must be that of a trusted party for the chain to have validity.

Accordingly, the Attribute-Value pairs and the External signature are stored in an archive file known as a "jar" file. The jar file provides a convenient mechanism in which to store multiple components together in one file. Moreover, in accordance with the present invention, the jar-file utility programs provide a convenient method to compress the selected components, and to sign the components. It is to be noted, however, in accordance with another embodiment of the present invention, the Attribute-Value pairs are stored within the PKCS #7 signed data content type block, in which case the PKCS#7 signed data content type block is not said to be an External signature, and the policy file consists solely of the PKCS#7 signed data content type block.

A Private Key is a block of data (actually a very large number) used to sign (make a digital signature for) another document. The private key must be kept secret by the signer if the signatures it generates are to be trusted. On the other hand, a public key is a block of data (actually a very large number) used to verify the digital signature on a digitally-signed document. Unlike the Private Key, the Public Key need not be kept secret, and may be distributed to the public. A Public Key is usually conveyed in a signed document called a certificate. A certificate is a document containing a signer's name and public key, and the signature of a third party, vouching for the accurate identification of the party named in the certificate. A certificate is used to obtain the public key needed to verify a digital signature made by the party named in the certificate.

Furthermore, as illustrated above, in accordance with the present invention, the cryptographic policy module in the program performs its services when the user begins the program's execution on the user's computer. It also performs its services whenever the user attempts to change the configuration of the cryptographic functions within the program.

Figure 5:
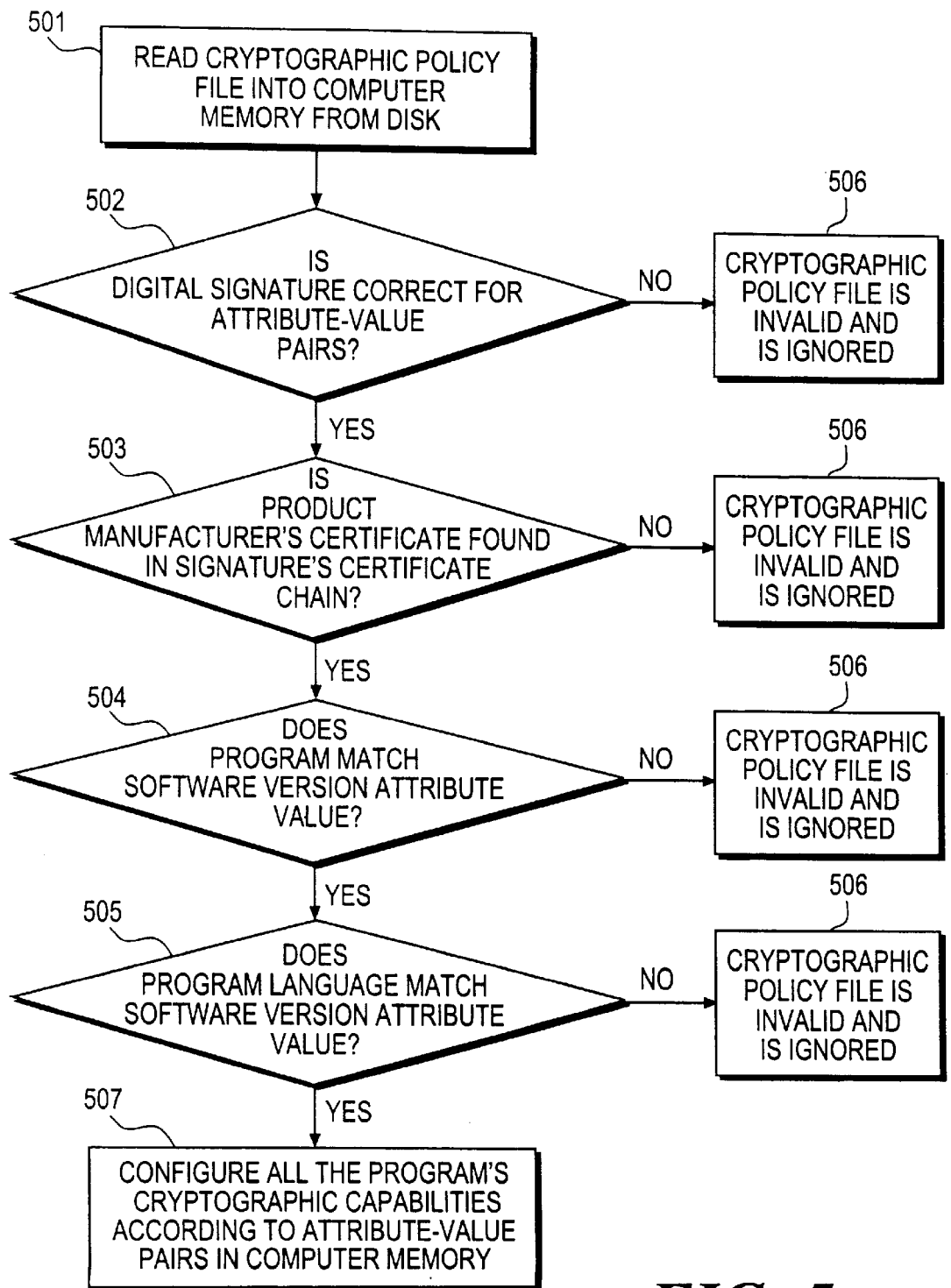
FIG. 5 illustrates a flow chart of a cryptographic policy module using a cryptographic policy file in accordance with an embodiment of the present invention.

As shown in FIG. 5, when the program begins executing, the cryptographic policy module first reads the cryptographic policy file into the computer's memory (as shown in step 501). Then, the policy module verifies the digital signature on the Attribute-Value pairs at step 502. At step 503, the module verifies that the digital signature is a genuine digital signature of the product's manufacturer by determining that one or more of the certificates in the digital signature's certificate chain is the certificate issued by the manufacturer for that very purpose. This is accomplished in the present invention by comparing to a "built-in" CA certificate. At step 504, a further verification is performed which confirms that the Software-Version Attribute value string matches the version of the running program. Finally, at step 505 yet another verification is performed, confirming that the localization (language) specified in the Software-Version Attribute value string matches the localization in use by the running program.

If the verification in any of the above steps 502–505 fails, then the entire content of the cryptographic policy file is ignored at step 506, and the program behaves according to its default set of encryption rules, which generally is the most restrictive set of cryptographic capabilities in the program. If, on the other hand, all of the verification steps 502–505 are successful, then the cryptographic policy module proceeds to step 507 where the cryptographic software in the running application program is configured for each and every one of the cryptographic capabilities listed in a set of Attribute-Value pairs. The capabilities that are enabled or disabled according to a "truth expression" are enabled or disabled according to the expression in the relevant Attribute-Value pair in the corresponding policy file. The capabilities that vary by number (for example, key length) are set to the numeric value in the relevant pair. Any values not specified are left in their default configuration, which is generally off, or using the smallest numeric value.

Figure 6:
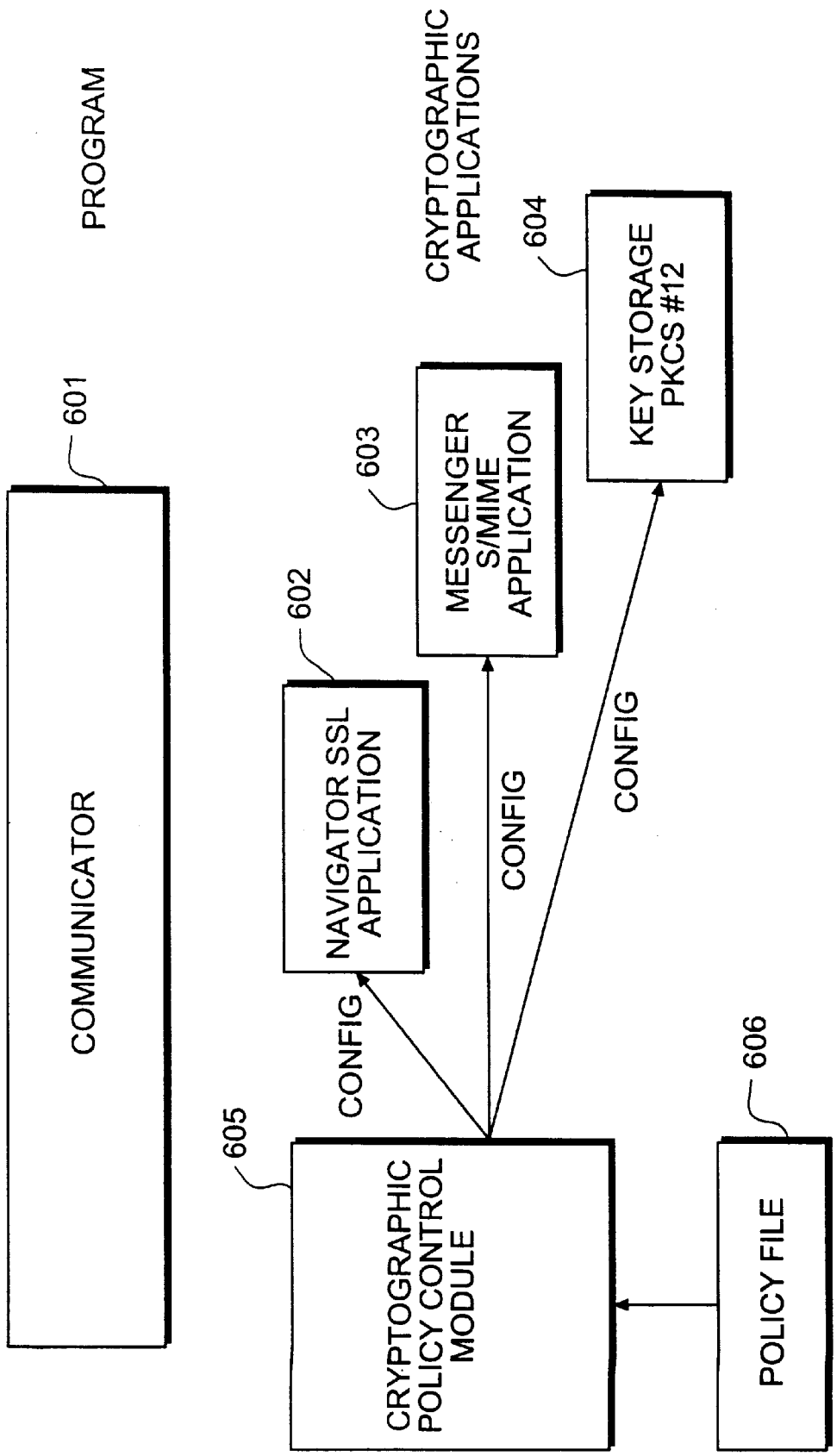
FIG. 6 illustrates a block diagram of a system including a policy file and module in accordance with an embodiment of the present invention.

FIG. 6 illustrates a block diagram of a system including a policy file and a cryptographic policy control module in accordance with one embodiment of the present invention. In such a system, there is provided an application program such as the Netscape Communicator® 601 which includes a plurality of applications such as the Navigator SSL 602, the Messenger S/MIME 603, and the Key Storage PKCS #12 603 as three cryptographic applications. There is also provided a cryptographic policy control module 605 which configures each of the three cryptographic applications, Navigator SSL 602, the Messenger S/MIME 603, and the Key Storage PKCS #12 603 in accordance with a predetermined data string received from a policy file 606. Policy files can be used to directly configure a trusted application, or can be used as the mechanism to configure policy filters as described in the first embodiment of the present invention.

Also, in accordance with the present invention, the application's user is generally allowed to select preferences among the various cryptographic capabilities available, and may elect to disallow certain of the approved capabilities, or to re-enable capabilities that he has previously disallowed. In this manner, the user may alter those preferences while the program is running, When the user attempts to do so, the cryptographic policy module is again used to ensure that the user cannot enable any capabilities that are disallowed by the cryptographic policy file.

In this manner, according to the present invention, a single program can be made and sold in all markets. The manufacturer spends only as much production, testing and support as a single program requires, and the program provides stronger encryption where it is legally allowed.

Various other modifications and alterations in the structure and method of operation of this invention will be apparent to those skilled in the art without departing from the scope and spirit of the invention. Although the invention has been described in connection with specific embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A system for controlling cryptographic functions of an application program, the system comprising:

storage means for storing a policy file, the policy file including an attribute portion that stores a plurality of cryptographic policy attributes, a value portion that stores a plurality of attribute values, and a signature portion, each of the attribute values corresponding to each of the cryptographic policy attributes, the signature portion including digital certificates for validating a signer's certificate;

control means for selectively retrieving encryption and/or decryption information from the policy file; and processing means for selectively processing the retrieved encryption and/or decryption information from the policy file in accordance with a predetermined capability condition, and for providing allowable encryption and/or decryption levels to the application program, wherein the storage means is an archive file.

2. The system of claim 1, wherein each of the cryptographic policy attributes includes an indication of the cryptographic capabilities of the application program, and each of the attribute values is one of a string, an integer number, and a truth expression.

3. The system of claim 2, wherein the truth expression is one of a true flag, a false flag, and a conditional flag.

4. The system of claim 1, wherein the plurality of attributes and values are compressed in the storage means, and further including decompressing means for decompressing the compressed plurality of attributes and values in accordance with said control means retrieving the compressed plurality of attributes and values.

5. A system for controlling cryptographic functions of an application program, the system comprising:

storage means for storing a policy file, the policy file including an attribute portion that stores a plurality of cryptographic policy attributes, a value portion that stores a plurality of attribute values, and a signature portion, each of the attribute values corresponding to each of the cryptographic policy attributes, each of the cryptographic policy attributes including an indication of the cryptographic capabilities of the application program, and each of the attribute values is one of a string, an integer number, and a truth expression, and the signature portion including digital certificates for validating a signer's certificate;

control means for selectively retrieving encryption and/or decryption information from the policy file; and processing means for selectively processing said retrieved encryption and/or decryption information from the policy file in accordance with a predetermined capability condition, and for providing allowable encryption and/or decryption levels to the application program, wherein the storage means is an archive file.

6. The system of claim 5, wherein the plurality of attributes and values are compressed in the storage means, and further including decompression means for decompressing the compressed plurality of attributes and values in accordance with said control means retrieving the compressed plurality of attributes and values.

7. A method of validating a cryptographic policy file for controlling cryptographic functions in an application program, the method comprising:

retrieving a policy file including an attribute portion, a value portion and a signature portion from a storage means;

verifying a digital signature of an attribute-value pair stored in the storage means;

performing a verification of the application program version with a software-version attribute value of the policy file in the storage means; and confirming localization information of the application program with a localization in the software-version attribute value of the policy file.

8. The method of claim 7, wherein the policy file is determined invalid and ignored by the application program when any one of verifying, performing, and confirming fails.

9. The method of claim 7, the method further comprising:

configuring each of the application cryptographic capabilities in accordance with the plurality of attribute-value pairs.

10. The method of claim 7, wherein verifying includes determining that one or a plurality of certificates in the digital signature certificate chain includes a certificate issued by a manufacturer of the application.

11. The method of claim 10, wherein determining includes comparing the digital signature to a predetermined certificate.

12. The method of claim 11, wherein the predetermined certificate includes a certification authority (CA) certificate.

13. A system for controlling cryptographic functions of an application program, the system comprising:

a storage unit for storing a policy file, the policy file including an attribute portion that stores a plurality of cryptographic policy attributes, a value portion that stores a plurality of attribute values, and a signature portion, each of the attribute values corresponding to each of the cryptographic policy attributes, the signature portion including digital certificates for validating a signer's certificate;

a controller for selectively retrieving encryption and/or decryption information from the policy file; and a processor for selectively processing the retrieved encryption and/or decryption information from the policy file in accordance with a predetermined capability condition, and for providing allowable encryption and/or decryption levels to the application program, wherein the storage unit is an archive file.

14. The system of claim 13, wherein each of the cryptographic policy attributes includes an indication of the cryptographic capabilities of the application program, and each of the attribute values is one of a string, an integer number, and a truth expression.

15. The system of claim 14, wherein the truth expression is one of a true flag, a false flag, and a conditional flag.

16. The system of claim 15, wherein the plurality of attributes and values are compressed in the storage unit, and further including a decompressing unit for decompressing the compressed plurality of attributes and values in accordance with the controller retrieving the compressed plurality of attributes and values.

17. The system of claim 13, wherein the plurality of attributes and values are compressed in the storage unit, and further including a decompressing unit for decompressing the compressed plurality of attributes and values in accordance with the controller retrieving the compressed plurality of attributes and values.

18. The system of claim 13, wherein the plurality of attributes and values are compressed in the storage unit, and further including a decompressing unit for decompressing the compressed plurality of attributes and values in accordance with the controller retrieving the compressed plurality of attributes and values.

19. A system for controlling cryptographic functions of an application program, the system comprising:

a storage unit for storing a policy file, the policy file including an attribute portion that stores a plurality of cryptographic policy attributes, a value portion that stores a plurality of attribute values, and a signature portion, each of the attribute values corresponding to each of the cryptographic policy attributes, each of the cryptographic policy attributes including an indication of the cryptographic capabilities of the application program, and each of the attribute values is one of a string, an integer number, and a truth expression, and the signature portion including digital certificates for validating a signer's certificate;

a controller for selectively retrieving encryption and/or decryption information from the policy file; and a processor for selectively processing the retrieved encryption and/or decryption information from the policy file in accordance with a predetermined capability condition, and for providing allowable encryption and/or decryption levels to the application program, wherein the storage unit in an archive file.

20. The system of claim 19, wherein the plurality of attributes and values are compressed in the storage unit, and further including a decompression unit for decompressing the compressed plurality of attributes and values in accordance with the controller retrieving the compressed plurality of attributes and values.

21. The system of claim 19, wherein the plurality of attributes and values are compressed in the storage unit, and further including a decompression unit for decompressing the compressed plurality of attributes and values in accordance with the controller retrieving the compressed plurality of attributes and values.

* * * * *